(12) United States Patent
Ito et al.

(10) Patent No.: US 7,692,692 B2
(45) Date of Patent: Apr. 6, 2010

(54) IMAGING APPARATUS WITH DILUTION OF PIXEL DATA FOR IMPROVED VISIBILITY

(75) Inventors: Katsuhide Ito, Hamamatsu (JP); Takayuki Kawashima, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 323 days.

(21) Appl. No.: 11/889,852

(22) Filed: Aug. 16, 2007

(65) Prior Publication Data
US 2008/0284892 A1 Nov. 20, 2008

(30) Foreign Application Priority Data
May 16, 2007 (JP) .................. P2007-130893

(51) Int. Cl.
H04N 5/228 (2006.01)
H04N 5/225 (2006.01)
G06K 9/44 (2006.01)
G06K 9/20 (2006.01)

(52) U.S. Cl. .............. 348/222.1; 348/216.1; 382/257; 382/283

(58) Field of Classification Search .............. 348/216.1, 348/217.1, 229.1, 230.1; 382/257, 283, 274, 382/264
See application file for complete search history.

(56) References Cited

U.S. PATENT DOCUMENTS

| 4,665,554 | A | * | 5/1987 | Sternberg | .................... 382/308 |
| 4,980,923 | A | * | 12/1990 | Kawamoto et al. | ........... 382/257 |
| 5,337,340 | A | | 8/1994 | Hynecek | |
| 6,058,218 | A | * | 5/2000 | Cline | ........................ 382/254 |
| 6,192,160 | B1 | * | 2/2001 | Sunwoo et al. | .............. 382/257 |
| 6,444,968 | B1 | | 9/2002 | Burt et al. | |
| 6,832,007 | B1 | * | 12/2004 | Zhang et al. | ................. 382/257 |
| 7,116,447 | B2 | * | 10/2006 | Braun et al. | ................ 358/3.12 |
| 7,378,634 | B2 | * | 5/2008 | Tower et al. | ................ 250/207 |
| 7,609,311 | B2 | * | 10/2009 | Denvir | ..................... 348/311 |
| 2006/0159360 | A1 | * | 7/2006 | Vaz et al. | ..................... 382/257 |

FOREIGN PATENT DOCUMENTS

| JP | 2003-279411 | 10/2003 |
| JP | 3483261 | 10/2003 |
| JP | 3862850 | 10/2006 |

* cited by examiner

Primary Examiner—John M Villecco
(74) Attorney, Agent, or Firm—Drinker Biddle & Reath LLP

(57) ABSTRACT

An imaging apparatus includes an image pickup device having a two-dimensionally arrayed pixel structure, an A/D converter which converts analog signals from the respective pixels into digital data signals, and a DSP 30 which performs signal processing for the data signals. The DSP 30 includes an image data storage 32 which stores the data signals in units of data signal sequences corresponding to pixel lines, a mask processor 34 which sets an integer n not less than 2 as a dilation coefficient and performs mask processing to dilate image components in the image data to n×n, and a data storing controller 37 which sets n calculation memory regions in which n data signal sequences corresponding to n pixel lines are stored, in the storage 32, according to the dilation coefficient n. Thereby, an imaging apparatus capable of acquiring an image with excellent visibility even under conditions of a low illuminance, etc., is realized.

12 Claims, 17 Drawing Sheets

(a)

(b)

(a)

(b)

(c)

(a)

(b)

(a)

(b)

(a)

(b)

(c)

(a)

(b)

(a)

(b)

(a)

(b)

(c)

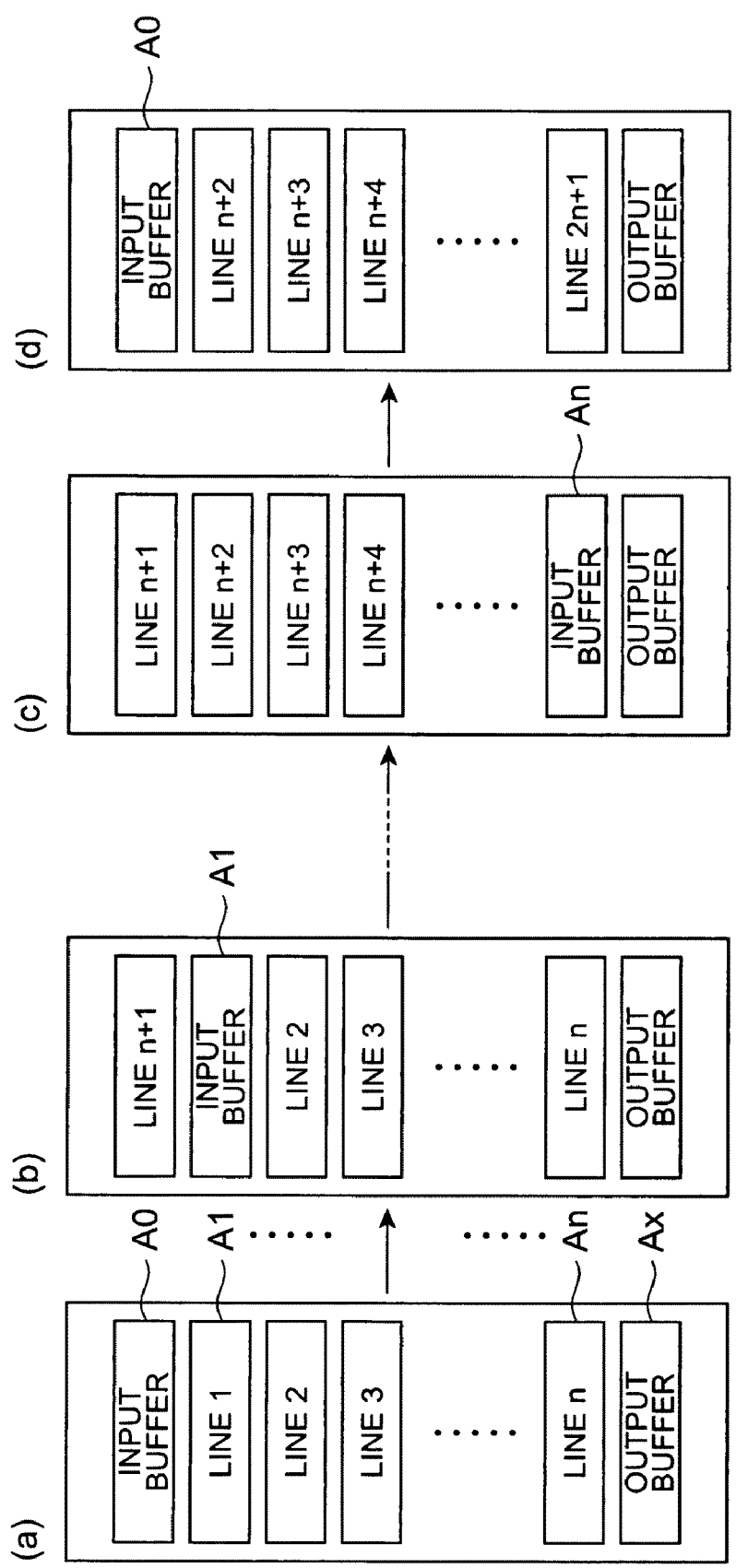

IMAGING APPARATUS WITH DILUTION OF PIXEL DATA FOR IMPROVED VISIBILITY

BACKGROUND OF THE INVENTION

1. Field of the Invention

The present invention relates to an imaging apparatus using a solid-state image pickup device having a two-dimensionally arrayed pixel structure.

2. Related Background Art

Recently, an electron multiplying CCD (EM-CCD) has been developed and used as a solid-state image pickup device having an electron multiplying function. In the EM-CCD, a multiplier register is provided for a horizontal shift register which outputs charge signals from respective pixels of an imaging section, and in this multiplier register, by transferring charges by a voltage higher than normal, the charge signals are multiplied.

Herein, at the time of fluorescent observation of a sample such as a cell with a fluorescence microscope, fluorescence from the sample may be weak, so that it may be difficult to acquire an image at a sufficient sensitivity by using a normal image pickup device. On the other hand, the EM-CCD camera using the above-described electron multiplying CCD is useful for acquiring an image including such weak light at a high sensitivity as well as an ICCD camera and an EB-CCD camera, etc., which also have the electron multiplying function. The EM-CCD camera can be preferably used in various fields that require image acquisition at a high sensitivity as well as measurement of weak light in the above-described fluorescence observation (refer to, for example, Patent Document 1: Japanese Patent Publication No. 3483261, Patent Document 2: Japanese Patent Publication No. 3862850, and Patent document 3: Japanese Patent Application Laid-Open No. 2003-279411).

SUMMARY OF THE INVENTION

In the above-described EM-CCD camera, charge signals generated in the respective pixels of the CCD are multiplied for each pixel, so that this is superior in terms of spatial resolution to an ICCD camera which uses an image intensifier to perform electron multiplication or the like. On the other hand, in image acquisition under conditions of a low illuminance and a very small number of incident photons on the CCD, if the EM-CCD camera is used, due to its high spatial resolution, the visibility of an image may come into question.

That is, in an imaging condition for capturing incident photons one by one, when the ICCD camera is used, if the electron multiplication gain is raised, an image of one photon is outputted as intensity signals of a plurality of pixels. On the other hand, when the EM-CCD camera is used, even if the electron multiplication gain is raised, due to its high spatial resolution, the image of one photon is outputted still as an intensity signal of one pixel. In this case, the spatial resolution is higher than in the ICCD camera, however, the visibility of the image of each photon in the image to be acquired comes into question. Besides the EM-CCD, this problem also generally occurs when other image pickup devices with high spatial resolution are used.

The present invention was made in order to solve the above-described problem, and an object thereof is to provide an imaging apparatus capable of acquiring an image with excellent visibility even under conditions of a low illuminance and a small number of incident photons.

In order to achieve this object, an imaging apparatus of the present invention includes (1) a solid-state image pickup device which has a pixel structure formed by a plurality of two-dimensionally arrayed pixels constructed by aligning vertically a plurality of pixel lines each consisting of a predetermined number of pixels aligned horizontally, and outputs charge signals generated in the respective pixels; (2) A/D converting means for converting analog signals of charge signals from the respective pixels of the solid-state image pickup device into digital data signals; and (3) digital signal processing means for performing signal processing for data signals outputted from the A/D converting means, wherein the digital signal processing means includes (4) image data storing means for storing data signals inputted from the A/D converting means into the digital signal processing means in units of data signal sequences each consisting of a predetermined number of data signals corresponding to pixel lines in the solid-state image pickup device; (5) mask processing means for executing, for image data composed of a plurality of data signals corresponding to the plurality of pixels in the solid-state image pickup device, mask processing for dilating an image component in the image data to n×n by setting an integer n not less than 2 as a dilation coefficient; and (6) data storing control means for controlling storing and input/output of the data signals in the image data storing means, and according to the dilation coefficient n set by the mask processing means, setting n calculation memory regions in each in which n data signal sequences corresponding to the n pixel lines continuous in the vertical direction in the solid-state image pickup device are stored, respectively, in the image data storing means.

In the above-described imaging apparatus, digital signal processing means is provided for output signals from the solid-state image pickup device, and in this digital signal processing means, dilation processing is performed for image components in the image data. Thereby, even when an image pickup device with high spatial resolution is used, under conditions of a low illuminance and a small number of incident photons, it becomes possible to acquire an image with excellent visibility of image components such as images of individual photons. For the dilation processing for image components, instead of image processing in an external apparatus or the like after image acquisition, mask processing is performed by digital signal processing means such as a digital signal processor (DSP) installed in the imaging apparatus. Thereby, it is possible that mask processing is performed in real time and desired image data with excellent visibility is acquired as output image data from the imaging apparatus.

In the above-described configuration in which mask processing is performed for image data by the digital signal processing means in the imaging apparatus, in the image data storing means in which data signals are stored in the digital signal processing means, data signals are stored in units of data signal sequences corresponding to pixel lines in the image pickup device, and corresponding to the dilation coefficient n of the mask processing, n calculation memory regions are set, and n data signal sequences necessary for dilation processing of n×n are stored in the image data storing means. By employing this memory configuration, in the digital signal processing means such as a DSP which has a limitation in capacity of its internal memory, mask processing to the image data can be preferably realized.

According to the imaging apparatus of the present invention, dilation processing is performed for image components in image data in the digital signal processing means provided for output signals from the solid-state image pickup device, and in the image data storing means in the digital signal processing means, data signals are stored in units of data signal sequences corresponding to pixel lines in the image pickup device, n calculation memory regions corresponding to the dilation coefficient n of the mask processing are set, and n data signal sequences necessary for dilation processing of n×n are stored, whereby an image with excellent visibility can be acquired even under conditions of a low illuminance and a small number of incident photons.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 17 is a figure of diagrams showing an example of a method for controlling storing of data signals in the image data storage.

DESCRIPTION OF THE PREFERRED EMBODIMENTS

Figure 1:
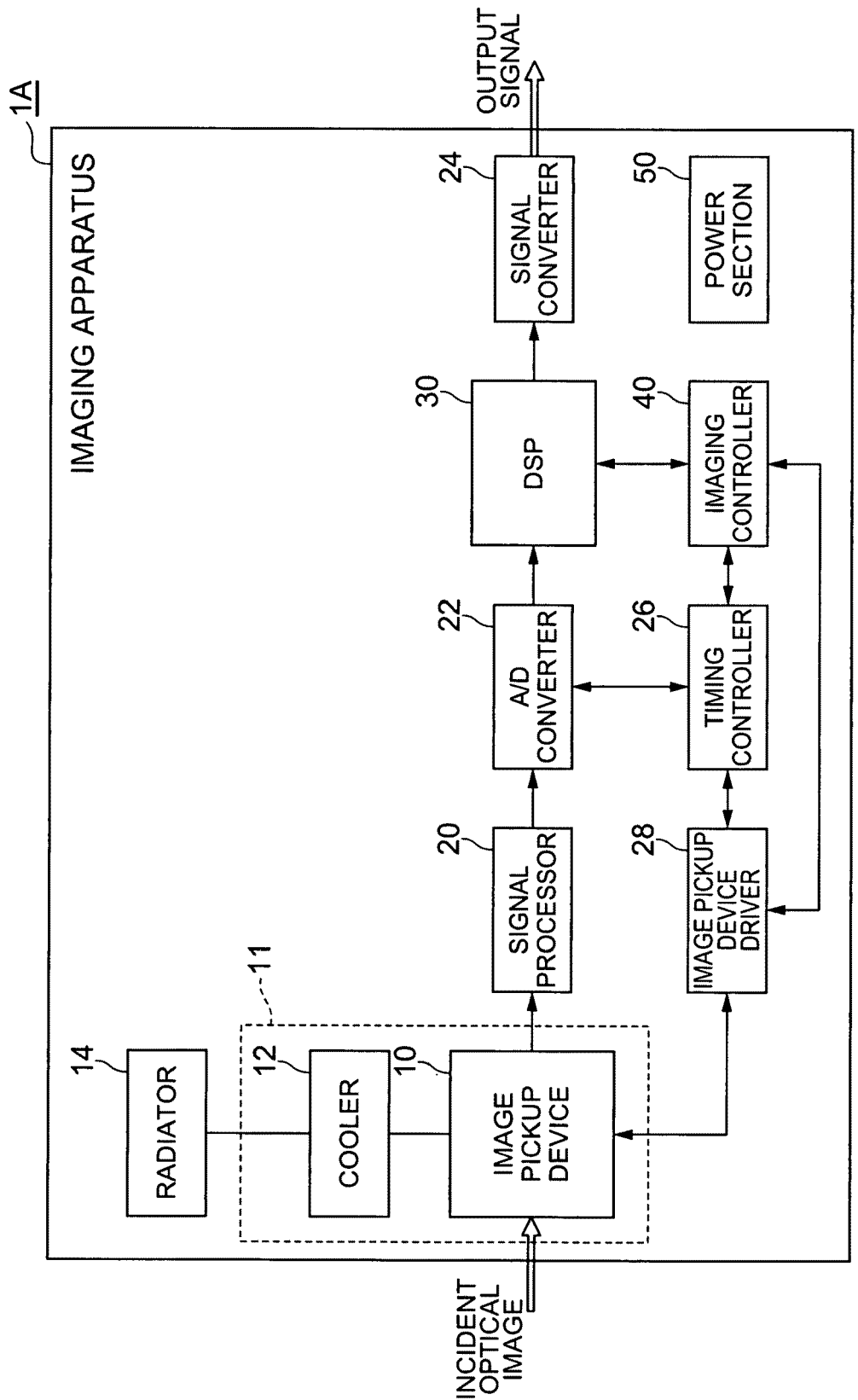
FIG. 1 is a block diagram showing a configuration of an embodiment of the imaging apparatus.

Hereinafter, preferred embodiments of the imaging apparatus of the present invention will be described in detail with reference to the drawings. In the description of the drawings, the identical components are attached with the same reference numerals and overlapping description will be omitted. The dimensional ratios of the drawings are not necessarily equal to those described.

FIG. 1 is a block diagram showing a configuration of an embodiment of the imaging apparatus of the present invention. The imaging apparatus 1A of this embodiment includes a solid-state image pickup device 10. This image pickup device 10 is a solid-state image pickup device which has a pixel structure consisting of a plurality of two-dimensionally arrayed pixels formed by arranging vertically a plurality of pixel lines each consisting of a predetermined number of pixels aligned horizontally, and outputs charge signals generated in the respective pixels.

As an example of this solid-state image pickup device 10, an electron multiplying solid-state image pickup device which has a plurality of arrayed pixels, outputs charge signals generated according to light incident amounts in the respective pixels, and has an electron multiplier section which multiplies the charge signals, can be used. Hereinafter, a configuration, etc., of the imaging apparatus is described by exemplifying a case where an electron multiplying solid-state image pickup device (EM-CCD) is used mainly as the image pickup device 10. However, the solid-state image pickup device to be applied to the imaging apparatus of the present invention is not limited to the electron multiplying solid-state image pickup device.

Figure 2:
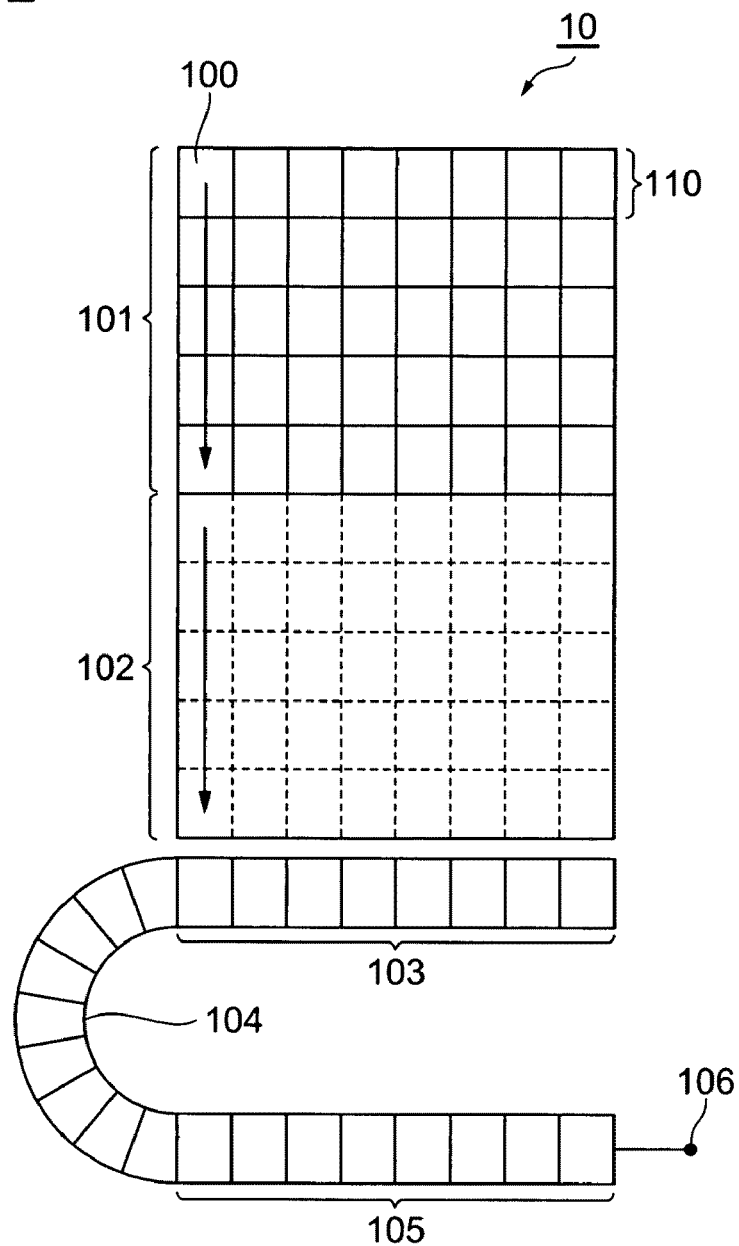
FIG. 2 is a schematic view showing an example of a configuration of an electron multiplying solid-state image pickup device.

FIG. 2 is a schematic view showing an example of a configuration of the electron multiplying solid-state image pickup device. The image pickup device 10 shown in FIG. 2 is constructed as a FT (frame transfer) type CCD including an imaging section 101 and an accumulating section 102 consisting of vertical shift registers, and a horizontal shift register 103. The imaging section 101 to be used for acquiring an image according to an incident optical image is structured so as to have a plurality of two-dimensionally arrayed unit pixels 100.

In detail, the imaging section 101 is constructed so as to have a two-dimensionally arrayed pixel structure by aligning a plurality of pixel lines 110 (5 lines in the configuration shown in FIG. 2) vertically (in a charge transfer direction in the vertical shift register of the imaging section 101) each consisting of a predetermined number of pixels (8 pixels in the configuration schematically shown in FIG. 2) aligned horizontally (in a charge transfer direction in the horizontal shift register 103).

The accumulating section 102 has a two-dimensional pixel structure similar to that of the imaging section 101, and is provided between the imaging section 101 and the horizontal shift register 103. The accumulating section 102 is masked with an opaque metal or the like and is not used for detection of an optical image, and is used for accumulation of charges generated in the respective pixels 100 of the imaging section 101 and transfer of charges to the horizontal shift register 103. The number of pixels in a matrix in the imaging section 101 and the accumulating section 102 can be arbitrarily set, and for example, a configuration including 512 pixels×512 lines can be used.

In the FT-type CCD 10 thus constructed, first, when an optical image is made incident on the imaging section 101, image acquisition is performed by generating charges corresponding to incident light in the respective pixels 100. Next, charge signals generated in the respective pixels 100 of the imaging section 101 are transferred vertically to the accumulating section 102, and charge signals of image data acquired in the imaging section 101 are accumulated in the accumulating section 102. Subsequently, reading-out of charge signals by the accumulating section 102 and the horizontal shift register 103 as an output register is performed.

In the configuration example shown in FIG. 2, in addition to the horizontal shift register 103, a multiplier register 105 as an electron multiplier section having an electron multiplying function is provided. Thereby, this CCD 10 is constructed as an electron multiplying CCD (EM-CCD) capable of multiplying charge signals by a predetermined multiplication gain by transferring charges by applying a voltage as a multiplying voltage higher than normal to the multiplier register 105. In this configuration, charge signals transferred from the respective pixels 100 of the imaging section 101 to the horizontal shift register 103 are further transferred to the multiplier register 105 via a connection register 104 and multiplied by a predetermined gain, and obtained multiplied charge signals are outputted as image data from the output terminal 106.

The detailed structure of the electron multiplying solid-state image pickup device 10 to be used in the imaging apparatus 1A is not limited to the structure shown in FIG. 2, and other structures may be used. For example, in FIG. 2, an FT-type EM-CCD having the imaging section 101 and the accumulating section 102 is illustrated as the image pickup device 10, however, it may be constructed as a FFT (full-frame transfer) type EM-CCD in which the accumulating section 102 is not provided. As the solid-state image pickup device 10, a CCD with another configuration that does not have the above-described electron multiplying function may also be used.

In the configuration shown in FIG. 1, for this electron multiplying solid-state image pickup device 10, a cooler 12 and a radiator 14 are provided. The cooler 12 is cooling means for reducing dark current noise and the like by maintaining the image pickup device 10 in a state that it is cooled to a predetermined temperature. As the cooler 12, for example, an electron cooling device such as a peltiert device can be preferably used.

The radiator 14 is connected to the radiation side of the cooler 12, and radiates heat by convection by using a fan or water circulation. In this configuration, for improvement in cooling performance and handling ease, it is preferable that the image pickup device 10 and the cooler 12 are sealed within a vacuum sealed tube 11 as schematically shown by the dashed line in FIG. 1. As the cooler 12, in detail, a cooling means other than the peltiert device may be used.

In the imaging apparatus 1A shown in FIG. 1, for the electron multiplying solid-state image pickup device 10 shown in FIG. 2, a signal processor 20, an A/D converter 22, a digital signal processor (DSP) 30, and a signal converter 24 are provided. The signal processor 20 is analog signal processing means for performing necessary signal processing for analog charge signals outputted from the image pickup device 10. For example, this signal processor 20 DC-restores analog video signals outputted from the image pickup device 10 and amplifies the analog signals so that they have amplitude suitable for A/D conversion at a subsequent stage.

The A/D converter 22 is A/D converting means for converting analog signals of charge signals from the respective pixels of the image pickup device 10 into digital data signals. In detail, the A/D converter 22 converts analog video signals outputted from the image pickup device 10 and DC-restored and amplified by the signal processor 20 into digital video signals as digital data signals.

The DSP 30 is digital signal processing means for performing signal processing for data signals outputted from the A/D converter 22. Data signals outputted from the A/D converter 22 are subjected to necessary signal processing in the DSP 30 and then inputted into the video signal converter 24. The signal converter 24 adds horizontal and vertical video synchronization signals to the digital signals as image data, and generates digital video signals as output signals to be outputted from the imaging apparatus 1A to the outside.

In the imaging apparatus 1A, for these image pickup device 10, signal processor 20, A/D converter 22, DSP 30, and signal converter 24, an imaging controller 40, a timing controller 26, and an image pickup device driver 28 are further provided. The imaging controller 40 includes a CPU for executing imaging control processing, and is control means for controlling operations of the respective parts including the DSP 30, the timing controller 26, the image pickup device driver 28 of the imaging apparatus 1A.

The timing controller 26 generates and outputs timing signals necessary for operations of the solid-state image pickup device 10 and the A/D converter 22, etc. The image pickup device driver 28 controls the driving of the electron multiplying solid-state image pickup device 10. In detail, the image pickup device driver 28 controls charge transfer in the imaging section 101, the accumulating section 102, and the respective registers 103, 104, and 105 and controls a multiplication condition such as a voltage applying condition to the multiplier register 105 by referring to timing signals from the timing controller 26, and if necessary, instruction signals from the imaging controller 40. A voltage necessary for operating the respective parts of the imaging apparatus 1A is supplied from a power section 50.

Figure 3:
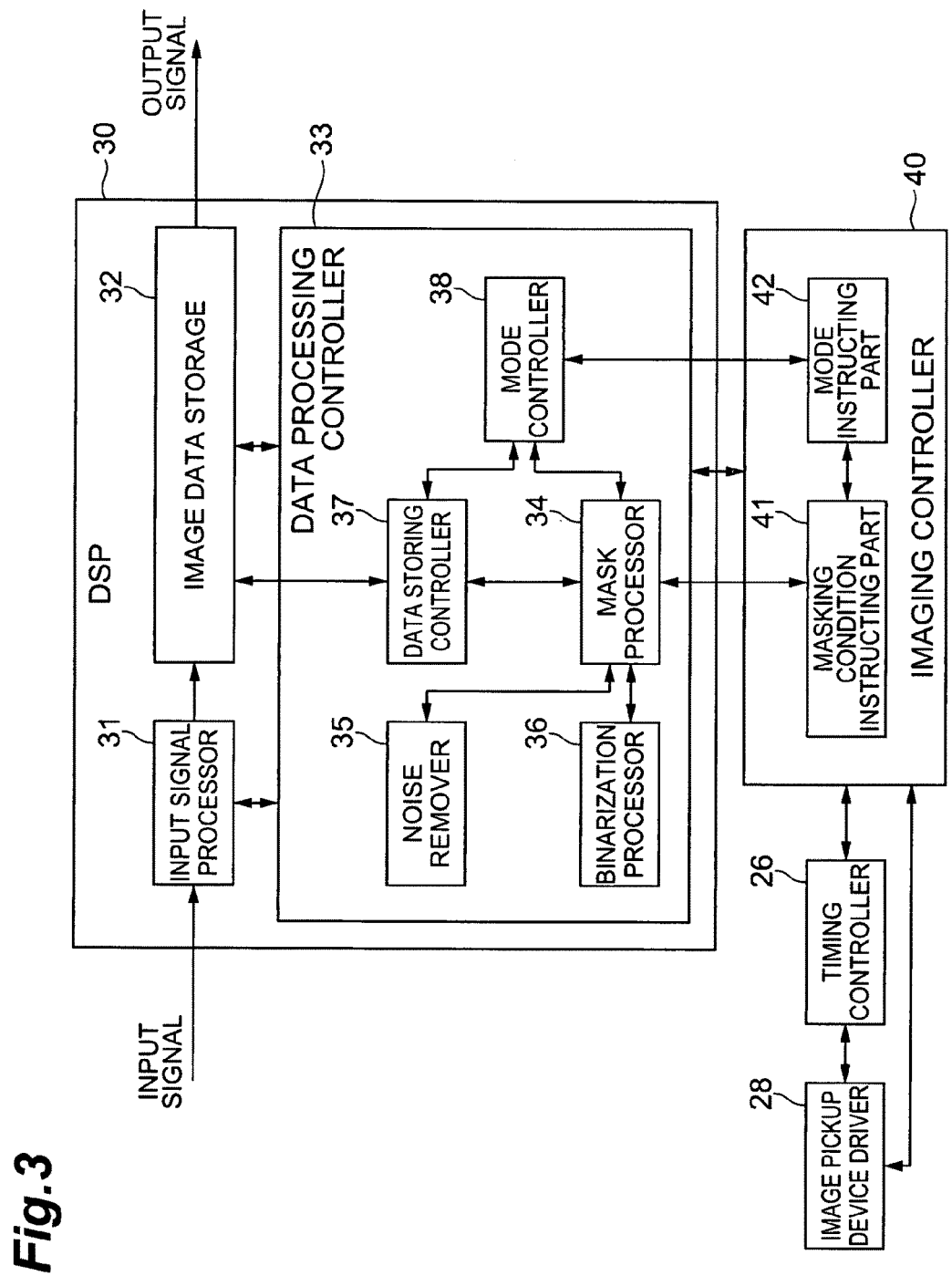
FIG. 3 is a block diagram showing configurations of a DSP and an imaging controller in the imaging apparatus.

The configuration of the imaging apparatus 1A according to this embodiment will be further described. FIG. 3 is a block diagram showing an example of detailed configurations of the DSP (digital signal processor) 30 and the imaging controller 40 in the imaging apparatus 1A shown in FIG. 1. In the configuration shown in FIG. 3, the DSP 30 includes an input signal processor 31, an image data storage 32, and a data processing controller 33. This DSP 30, for example, includes a DSP core for realizing the function of the data processing controller 33, a program memory, a data memory that serves as the image data storage 32, input/output ports necessary for inputting and outputting signals, and so on. As the configuration of the DSP 30, in detail, various configurations may be used.

The image data storage 32 is image data storing means for storing data signals inputted from the A/D converter 22 into the DSP 30 in units of data signal sequences each consisting of a predetermined number of data signals corresponding to pixel lines in the solid-state image pickup device 10. In this DSP 30, digital signals inputted into the DSP 30 are subjected to necessary signal processing in the input signal processor 31 and then stored in the image data storage 32, and outputted to the signal converter 24 at a subsequent stage. As signal processing to be executed in the input signal processor 31, for example, noise removal processing from a normal image is executed. This input signal processor 31 may not be provided if it is not necessary.

The data processing controller 33 controls signal processing operations in the input signal processor 31, and image data storing operations and input/output operations in the image data storage 32. This data processing controller 33 performs predetermined image processing for data signals of image data stored in the image data storage 32 if necessary.

In the imaging apparatus 1A of this embodiment, the DSP 30 is configured to become capable of performing mask processing including dilation processing of image components for data signals of image data to be stored in the image data storage 32. In the DSP 30 of the configuration example shown in FIG. 3, for performing image processing such as mask processing for data signals, in the data processing controller 33, a mask processor 34, a noise remover 35, a binarization processor 36, and a data storing controller 37 are provided.

The mask processor 34 is mask processing means for performing enlargement and dilation processing of image components included in an image for image data acquired by the solid-stage image pickup device 10. In detail, the mask processor 34 sets a plurality of data signals (for example, data signals of 512 pixels×512 lines) corresponding to a plurality of pixels 100 (see FIG. 2) in the imaging section 101 of the image pickup device 10 as processing targets, and sets an integer n not less than 2 as a dilation coefficient for the image data composed of the plurality of data signals. Then, by referring to this dilation coefficient n, mask processing for dilating the image component in the image data to n×n is executed.

Figure 4:
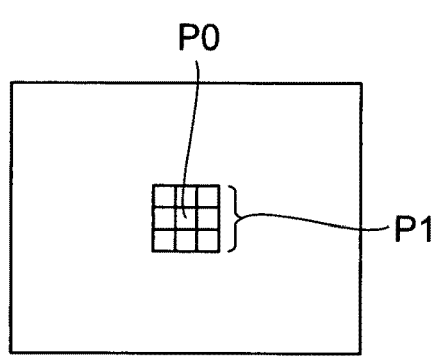
FIG. 4 is a figure of schematic views showing detailed examples of mask processing to image data.
Figure 4:
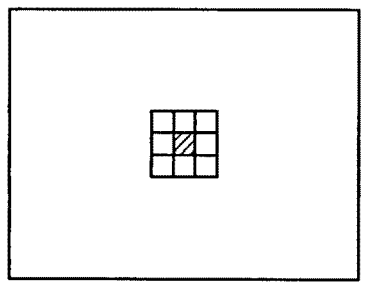
Figure 5:
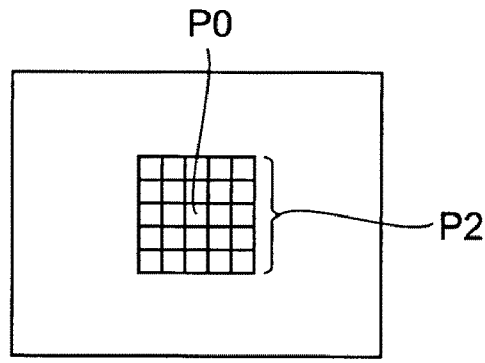
FIG. 5 is a figure of schematic views showing detailed examples of mask processing to image data.
Figure 5:
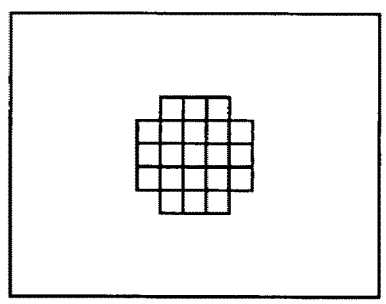
Figure 5:
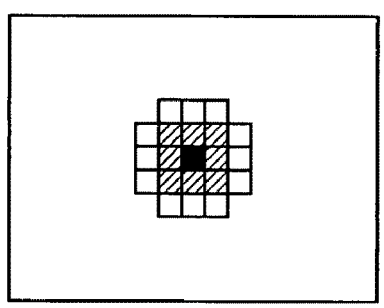

FIG. 4 and FIG. 5 are figures of schematic views showing detailed examples of mask processing to the image data to be executed in the mask processor 34. The processing example (a) of FIG. 4 is an example of mask processing when the dilation coefficient is set to n=3, showing mask processing performed for dilating an image component according to a data signal at the pixel P0 to a pixel region P1 of 3×3 centered on the pixel P0. The processing example (a) of FIG. 5 is an example of mask processing when the dilation coefficient is set to n=5, showing mask processing performed for dilating the image component according to the data signal at the pixel P0 to a pixel region P2 of 5×5 centered on the pixel P0.

When the mask processing is performed for the image data, intensity data of the pixel P0 spatially dilates to the pixel region of n×n, and its gain (digital gain) rises. In the mask processing for 3×3 shown in (a) of FIG. 4, the dilation gain becomes 3×3=9. In the mask processing for 5×5 shown in (a) of FIG. 5, the dilation gain becomes 5×5=25.

Figure 6:
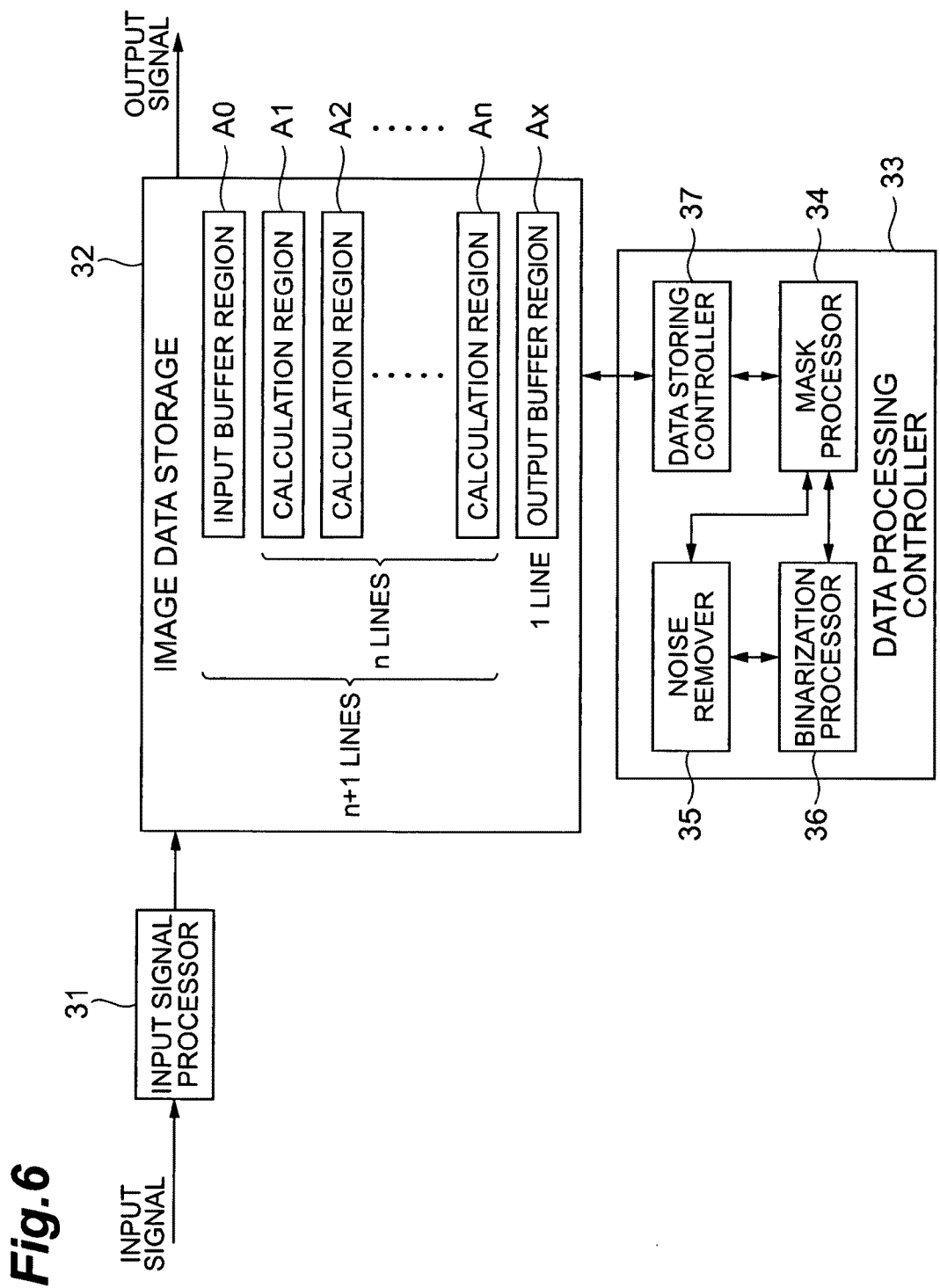
FIG. 6 is a diagram showing an example of a method for controlling storing of data signals in an image data storage.

The data storing controller 37 is data storing control means for controlling storing and input and output of data signals in the image data storage 32. FIG. 6 is a diagram showing a detailed example of a method for controlling storing of data signals in the image data storage 32 performed by the data storing controller 37. In the configuration example shown in FIG. 6, the data storing controller 37 sets n calculation memory regions A1 to An in which n data signal sequences corresponding to n pixel lines continuous in the vertical direction in the image pickup device 10 are stored, in the image data storage 32, according to the dilation coefficient n of mask processing set by the mask processor 34.

In this configuration example, in the image data storage 32, in addition to the above-described n calculation memory regions A1 to An, the data storing controller 37 sets an input buffer memory region A0 into which a data signal sequence inputted next to the n data signal sequences stored in the calculation memory regions A1 to An is stored, and an output buffer memory region Ax in which data signals after being subjected to mask processing by the mask processor 34 are stored.

The mask processor 34 sets a data signal in the central data signal sequence among n data signal sequences stored in the n calculation memory regions A1 to An of the image data storage 32 as a processing target, and performs mask processing for dilating the image component by referring to n×n data signals within the range of n×n around the data signals. Herein, FIG. 7 shows mask processing to be performed for data signal sequences stored in the calculation memory regions A1 to An.

Figure 7:
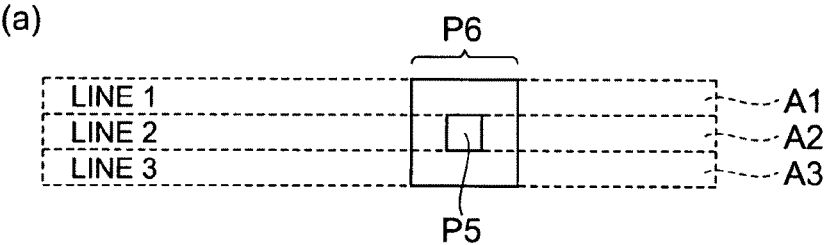
FIG. 7 is a figure of diagrams showing mask processing to be performed for data signal sequences stored in calculation memory regions.
Figure 7:
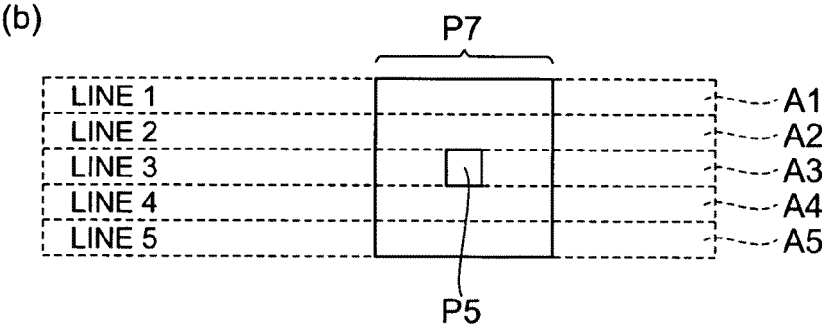

The processing example (a) of FIG. 7 shows a case where, when the dilation coefficient is set to n=3, three calculation memory regions A1 to A3 are set, and three data signal sequences corresponding to pixel lines 1 to 3 are stored in these memory regions. In this case, the mask processor 34 sets the data signal of the pixel P5 in the data signal sequence corresponding to line 2 positioned at the center of the lines 1 to 3 as a processing target, and performs mask processing by referring to 3×3 data signals of the pixel region P6 within the range of 3×3 centered on the data signal.

For example, when the mask processing shown in the processing example (a) of FIG. 4 is performed, the mask processor 34 sets a sum of 3×3=9 data signals of the pixel region P6 as a data signal after mask processing for the pixel P5, and writes the obtained data signal after mask processing on the output buffer memory region Ax. Such mask processing is executed for all pixels of the data signal sequence, whereby image data of the pixel line corresponding to the data signal sequence is masked.

The processing example (b) of FIG. 7 shows a case where, when the dilation coefficient is set to n=5, five calculation memory regions A1 to A5 are set, and five data signal sequences corresponding to pixel lines 1 to 5 are stored in these memory regions. In this case, the mask processor 34 sets the data signal of the pixel P5 in the data signal sequence corresponding to line 3 positioned at the center of lines 1 to 5 as a processing target, and performs mask processing by referring to 5×5 data signals of the pixel region P7 within the range of 5×5 centered on the data signal.

For example, when the mask processing shown in the processing example (a) of FIG. 5 is performed, the mask processor 34 sets a sum of 5×5=25 data signals of the pixel region P7 as a data signal after mask processing for the pixel P5, and writes the obtained data signal after mask processing on the output buffer memory region Ax. Such mask processing is executed for all pixels of the data signal sequence, whereby the image data of the pixel line corresponding to the data signal sequence is masked.

In the DSP 30 configured as shown in FIG. 3, in the data processing controller 33, a noise remover 35 and a binarization processor 36 are further provided for the mask processor 34 which performs dilation processing for image components in image data.

The noise remover 35 is noise removing means which sets a predetermined intensity value as an intensity threshold for noise removal for a plurality of intensity data signals corresponding to the plurality of pixels in the image pickup device 10, and removes data signals having intensity values not more than the intensity threshold as noise. As a noise removing method in this case, for example, a processing method in which the intensity value of the data signal having the intensity value not more than the intensity threshold is set to zero can be used.

When noise removal processing is thus performed by the noise remover 35, it is preferable that the mask processor 34 performs mask processing to dilate data signals as image components to be masked except for data signals removed by the noise remover 35, to n×n. For example, when the processing method in which the intensity values not more than the intensity threshold are set to 0 as described above is used, the data signals are accordingly excluded from image components to be masked.

The binarization processor 36 is binarization processing means which sets a predetermined intensity value as an intensity threshold for binarization for a plurality of intensity data signals corresponding to the plurality of pixels in the image pickup device 10 and binarizes data signals based on the intensity threshold. As the binarizing method in this case, for example, a processing method in which data signals having intensity values not more than the intensity threshold are regarded as data signals that have no image components, and data signals having intensity values higher than the intensity threshold are regarded as data signals having image components, can be used.

When the binarization is thus performed by the binarization processor 36, it is preferable that the mask processor 34 sets data signals binarized by the binarization processor 36 as image components to be masked and performs mask processing for dilating these to n×n. These noise remover 35 and the binarization processor 36 may not be provided if they are not necessary.

In the imaging apparatus 1A of this embodiment, for the mask processing of image data to be performed in the mask processor 34 as described above, as imaging modes for the image data, two operation modes of a mask processing mode in which the mask processing is executed by the mask processor 34 and a normal processing mode in which the mask processing is not executed are prepared. In the data processing controller 33, a mode controller 38 is provided corresponding to these modes, and this mode controller 38 controls setting and switching of the imaging mode.

For the digital signal processor 30 thus configured, the imaging controller 40 includes a masking condition instructing part 41 and a mode instructing part 42. The mode instructing part 42 instructs the mode controller 38 of the DSP 30 to set and switch the mask processing mode and the normal processing mode. These setting and switching of the imaging modes are performed in response to an instruction from an operator via, for example, an imaging mode setting button or the like.

The masking condition instructing part 41 instructs the mask processor 34 of the DSP 30 on a condition, etc., of mask processing to be executed by the mask processor 34. For example, when the dilation coefficient n of mask processing is changeable in the mask processor 34, the masking condition instructing part 41 instructs the mask processor 34 to set or change the dilation coefficient n.

The effects of the imaging apparatus of the above-described embodiment will be described.

In the imaging apparatus 1A shown in FIG. 1 to FIG. 3, the DSP 30 is provided for output signals from the solid-state image pickup device 10, and this DSP 30 performs dilation processing for image components in image data. Thereby, even when an image pickup device with high spatial resolution is used as the image pickup device 10, under conditions of a low illuminance and a small number of incident photons, it becomes possible to acquire an image having image components such as images of the individual photons with excellent visibility.

In the above-described configuration, for this dilation processing of image components, to image data outputted from the imaging apparatus 1A after acquiring the image, mask processing is performed in the digital signal processing means such as the DSP 30 provided inside the imaging apparatus 1A instead of performing image processing by an external device. Thereby, the mask processing can be successively performed in real time and desired image data with excellent visibility can be obtained as output image data from the imaging apparatus 1A.

In the above-described configuration in which mask processing is performed for image data by the digital signal processing means such as the DSP 30 inside the imaging apparatus 1A, in the image data storage 32 in which data signals are stored in the DSP 30, the data signals are stored in units of data signal sequences corresponding to pixel lines in the image pickup device 10 and n calculation memory regions A1 to An corresponding to the dilation coefficient n of mask processing are set as shown in FIG. 6 so that n data signal sequences necessary for dilation processing of n×n are stored in the image data storage 32. By employing this memory configuration, in the digital signal processing means such as the DSP 30 that has a limitation in capacity of its internal memory, mask processing for image data can be preferably realized.

In the imaging apparatus 1A of the above-described embodiment, in the DSP 30, for the mask processing to be executed for image data, a mode controller 38 is provided which performs switching between the mask processing mode in which mask processing is executed by the mask processor 34 and the normal processing mode in which the mask processing is not executed. Thereby, image acquisition according to imaging conditions such as switching as to whether the mask processing is executed according to the imaging condition when acquiring an image in actuality becomes possible.

Concerning data signal output from the DSP 30, the device can be configured so that only data signals after mask processing are outputted when the mask processing mode is selected. Alternatively, it is also possible that the output of data signals in the image data storage 32 is controlled by the data storing controller 37 so that data signals after mask processing by the mask processor 34 and data signals before mask processing are both outputted to the outside. In this case, an operator who performs image acquisition by operating the imaging apparatus 1A can acquire and refer to both image data before and after mask processing as appropriate.

For data signals after mask processing in the DSP 30, as shown in FIG. 6, it is preferable that the data storing controller 37 sets an output buffer memory region Ax in which data signals after mask processing by the mask processor 34 are stored, in the image data storage 32. Thereby, holding and outputting to the outside of data signals after mask processing can be preferably realized.

In the imaging apparatus 1A of the above-described embodiment, in the DSP 30, a noise remover 35 for performing noise removal processing and a binarization processor 36 for performing binarization processing are provided for a plurality of data signals corresponding to a plurality of pixels in the image pickup device 10. This configuration, for example, can be effectively applied to processing, etc., of image data obtained under conditions of a low illuminance and a small number of incident photons. In this case, in detail, for example, processing is considered in which noise removal processing and binarization processing are performed for data signals of the respective pixels of the image data, and data signals of pixels on which it is judged that photons have been made incident are set to intensity 1 and data signals of pixels on which it is judged that photons have not been made incident are set to intensity 0.

These noise remover 35 and binarization processor 36 may not be provided if they are not necessary. It is also allowed that the noise removal and binarization processing are performed not in the data processing controller 33 but in the input signal processor 31. For setting the intensity thresholds for noise removal and binarization, for example, a method in which a noise image or the like is acquired in advance, and by referring to its intensity distribution, thresholds are set, may be used. When an electron multiplying solid-state image pickup device is used as the image pickup device 10 as described above, it is preferable that the intensity thresholds for noise removal and binarization are set according to a multiplication gain of charge signals set for the image pickup device 10.

As the solid-state image pickup device to be used in the imaging apparatus 1A configured as described above, as shown in FIG. 2, an electron multiplying solid-state image pickup device (EM-CCD) which outputs charge signals generated in the respective pixels of the plurality of pixels 100 and has an electron multiplier section for multiplying the charge signals can be preferably used. That is, in the imaging apparatus using the EM-CCD, even when the gain of electron multiplication is raised, an image of one photon is still outputted as an intensity signal of one pixel due to the high spatial resolution. On the other hand, by executing mask processing for image data acquired by the EM-CCD as described above, an image with excellent visibility of images of individual photons is obtained. Such mask processing can also be performed for image pickup devices other than the EM-CCD in the same manner.

Figure 8:
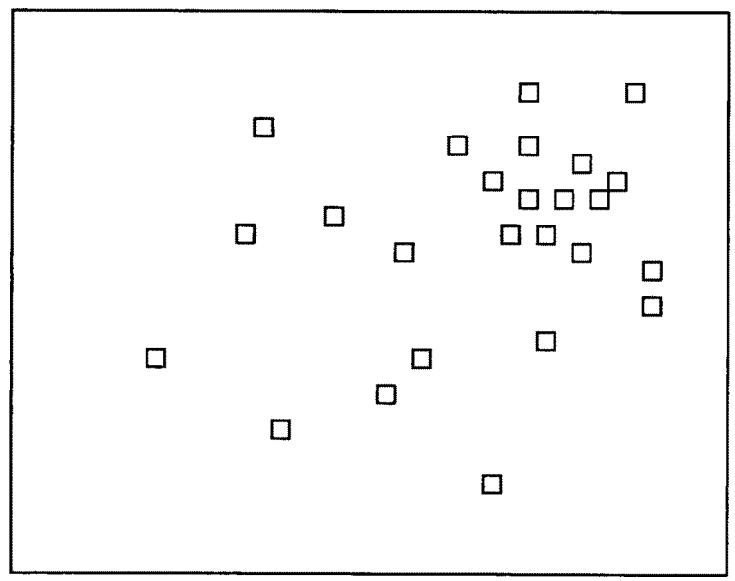
FIG. 8 is a figure of views showing an example of application of mask processing to image data.
Figure 8:
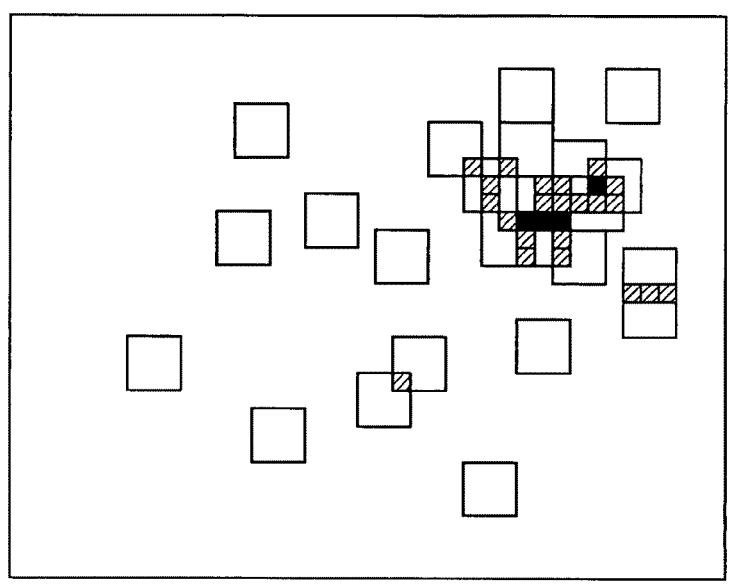

An improvement effect of the visibility of images of individual photons by performing mask processing for image data will be described. FIG. 8 is a figure of views schematically showing an example of application of mask processing to the image data. FIG. 8 shows an example in which mask processing is executed for the image (a) including images of a plurality of photons by setting a dilation coefficient to n=3 to generate the image (b).

In FIG. 8, the image (a) before mask processing is dotted with data signals of the intensity 1 in the image indicating that photons have been made incident on the pixels. In such image data, one pixel is fine, so that it may become difficult to visually recognize an image of one photon in the image. On the other hand, it is seen in the image (b) after mask processing that the visibility of individual photons is improved through dilation processing of 3×3 with a dilation gain of 9.

In this image (b), in the right region with a higher data signal density with intensity 1 in the image (a), not only image components with intensity 1 (white) but also image components after dilating partially overlap each other, whereby image components with intensity 2 (hatched) and image components with intensity 3 (black) are generated. That is, in the image (b) of FIG. 8, information on density of data signals with intensity 1 in the image (a) is converted into intensity distribution information with intensities 1 to 3. This effect is also obtained when dilation processing of 5×5 with a dilation gain of 25 is performed.

Figure 9:
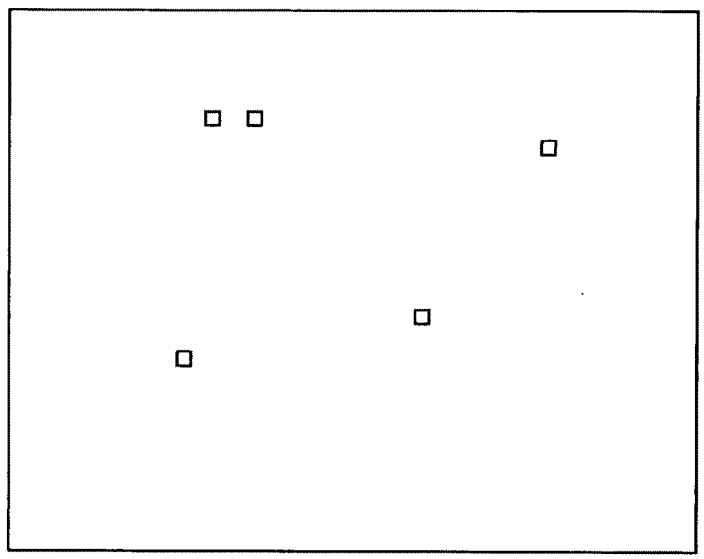
FIG. 9 is a figure of a view showing another example of application of mask processing to image data.
Figure 10:
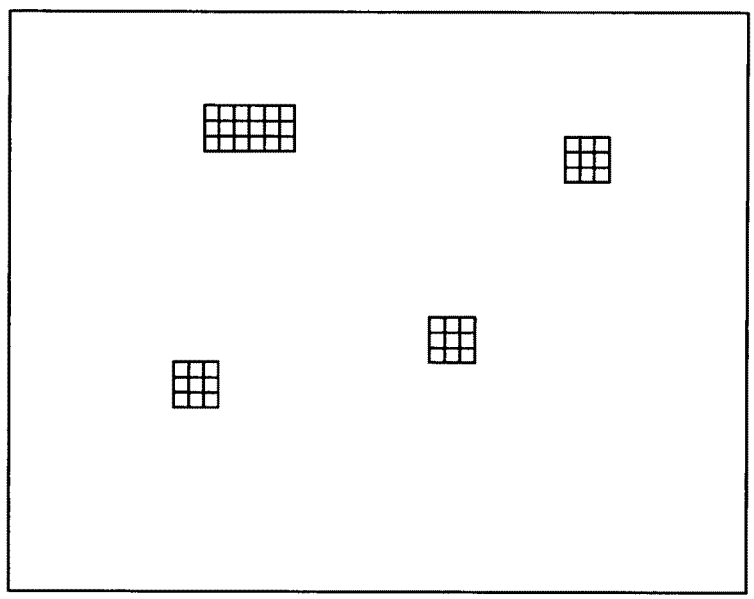
FIG. 10 is a figure of views showing another example of application of mask processing to image data.
Figure 10:
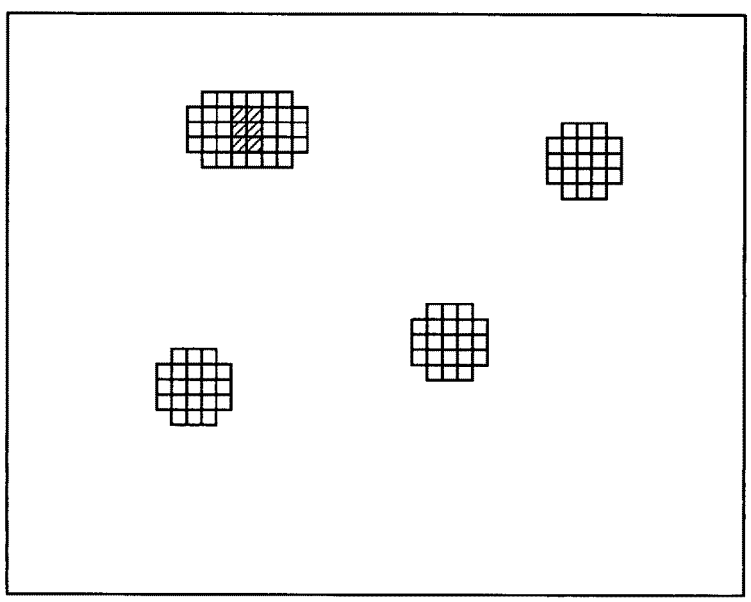

Thus, by performing mask processing of n×n for image data acquired in the image pickup device 10, in image data acquired under conditions of a low illuminance and a small number of incident photons, information on continuity or density of image components each corresponding to one photon can be acquired with excellent visibility. FIG. 9 and FIG. 10 are figures of views schematically showing another example of application of mask processing to image data. In this example, the image before mask processing shown in FIG. 9 is dotted with data signals of intensity 1, and on the other hand, in the image (a) of FIG. 10 through dilation processing of 3×3, information on continuity of data signals is obtained. In the image (b) of FIG. 10 through dilation processing of 5×5, information on density of data signals is obtained according to an intensity distribution in the image.

Figure 11:
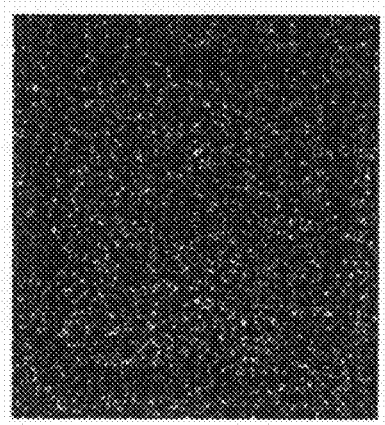
FIG. 11 is a figure of views showing another example of application of mask processing to image data.
Figure 11:
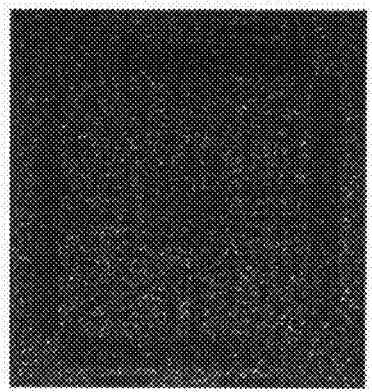
Figure 11:
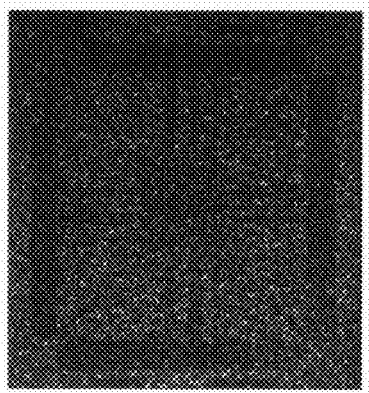

FIG. 11 is a figure of views showing another example of application of mask processing to image data. FIG. 11 concerns photon imaging for acquiring images of weak light with small amounts of incident photons and show an image (a) before mask processing, an image (b) after mask processing of 3×3, and an image (c) after mask processing of 5×5. Also, in these images (a) to (c), it is seen that the visibility of the images acquired from weak optical images is improved by executing mask processing for the image data.

Next, mask processing to be executed for image data in the mask processor 34 will be further described.

Preferably, determination as to whether mask processing is to be executed for image data and the dilation coefficient n of mask processing are arbitrarily set or changed by considering the characteristics of an image acquiring target and detailed imaging conditions, etc. For example, when the size of an emission point on the image acquiring target is known in advance, the dilation coefficient n can be set according to the size of the emission point. Generally, in terms of symmetry of mask processing, it is preferable that the dilation coefficient n is set to an odd number not less than 3 as in the case of the above-described example of n=3 or 5.

For the mask processing, it is preferable that the dilation coefficient n of the mask processing is changeable in the mask processor 34. Thereby, the dilation coefficient n for the mask processing can be set or switched according to the image acquiring target and imaging conditions. In this case, based on inputs, etc., from an operator, an instruction of setting and switching of the dilation coefficient n is given to the mask processor 34 of the DSP 30 from the masking condition instructing part 41 of the imaging controller 40.

For mask processing to dilate the image component in image data to n×n, in detail, the mask processing is not limited to simple dilation processing in which all pixels of n×n are weighted by 1 as shown in the processing example (a) of FIG. 4 and the processing example (a) of FIG. 5, various dilation processing methods can be used. For example, concerning dilation processing of 3×3, the processing example (b) of FIG. 4 shows dilation processing when the central one pixel is weighted by 2 and eight pixels around the central one are weighted by 1.

Concerning dilation processing of 5×5, the processing example (b) of FIG. 5 shows dilation processing in which four pixels positioned at the four corners among 5×5=25 pixels are weighted by 0 and are excluded from the dilation processing targets, and the other 21 pixels are weighted by 1. The processing example (c) of FIG. 5 shows dilation processing when, in addition to the above processing example (b), one pixel at the center is weighted by 3 and eight pixels around the central one are weighted by 2. For the image (b) of FIG. 10 aforementioned, the dilation processing method shown in (b) of FIG. 5 is used.

When such mask processing is performed for image data, as described above, the intensity data spatially spreads, whereby a certain dilation gain is generated. For this dilation gain, it is preferable, in order to simplify calculation, etc., of mask processing, that the dilation processing mask pattern is set so that the dilation gain becomes a multiple of 2 in the case of binary system, and becomes a multiple of 5 or 10 in the case of decimal system.

Figure 12:
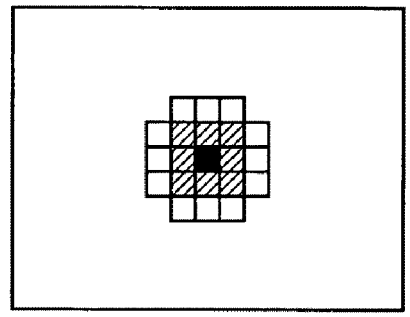
FIG. 12 is a figure of schematic views showing detailed examples of mask processing to image data.
Figure 12:
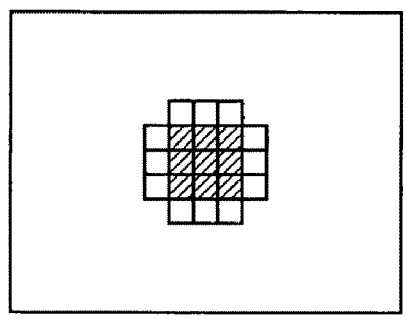

For example, in the processing example (a) of 3×3 shown in FIG. 4, the dilation gain of mask processing is 9, however, by weighting the mask pattern as shown in the processing example (b), the dilation gain can be set to 10 times a multiple of 10. In the processing example (a) (similar to the processing example (c) shown in FIG. 5) of 5×5 shown in FIG. 12, the dilation gain of mask processing is 31 times, however, by weighting the central pixel as in processing example (b) by 2, the dilation gain can be set to 30 times a multiple of 10.

In the imaging apparatus 1A of the above-described embodiment, as described above with reference to FIG. 7, the mask processor 34 sets a data signal in the central data signal sequence among n data signal sequences stored in n calculation memory regions A1 to An in the image data storage 32 as a processing target, and performs mask processing to dilate the image component by referring to data signals of n×n within the range of n×n centered on the data signal. Thereby, mask processing can be preferably executed for the respective data signal sequences.

In this mask processing, when a data signal as a processing target is a data signal corresponding to the pixel positioned on the outermost periphery in the pixel structure of the image pickup device 10 including a plurality of pixels, it is preferable that the mask processor 34 provides virtual data signals for a region including no existence of pixels outside the target pixel and performs mask processing for the data signal. Thereby, also to data signals of the pixels on the outermost periphery in image data, mask processing can be preferably executed.

Mask processing for data signals of pixels on the outermost periphery will be described in detail by assuming dilation processing of 3×3 as the mask processing. As shown in (a) of FIG. 13, in the case of the pixel (shown in black) 201 positioned at a corner of the imaging region 200 of the two-dimensionally arrayed pixel structure in the image pickup device 10, five pixels among eight pixels surrounding the pixel to be referred to for dilation processing are out of the imaging region in which no pixel exists and have no data signals. Also, in the case of pixels positioned on any of the upper, lower, left, and right sides of the imaging region 200, three among eight pixels surrounding the pixel are out of the imaging region. Therefore, the pixels within the outermost peripheral region 202 shown by the dashed line in (a) of FIG. 13 have no data signals necessary for mask processing outside the imaging region 200.

Figure 13:
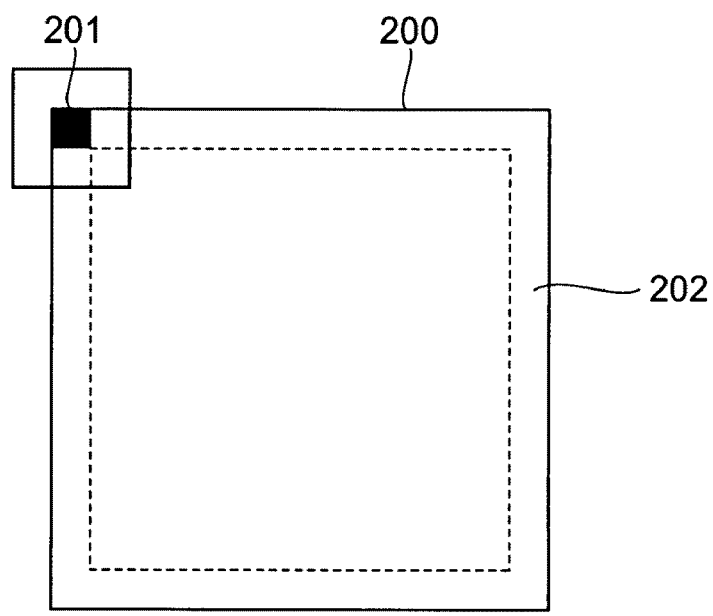
FIG. 13 is a figure of views showing mask processing to a data signal of the outermost peripheral pixel.
Figure 13:
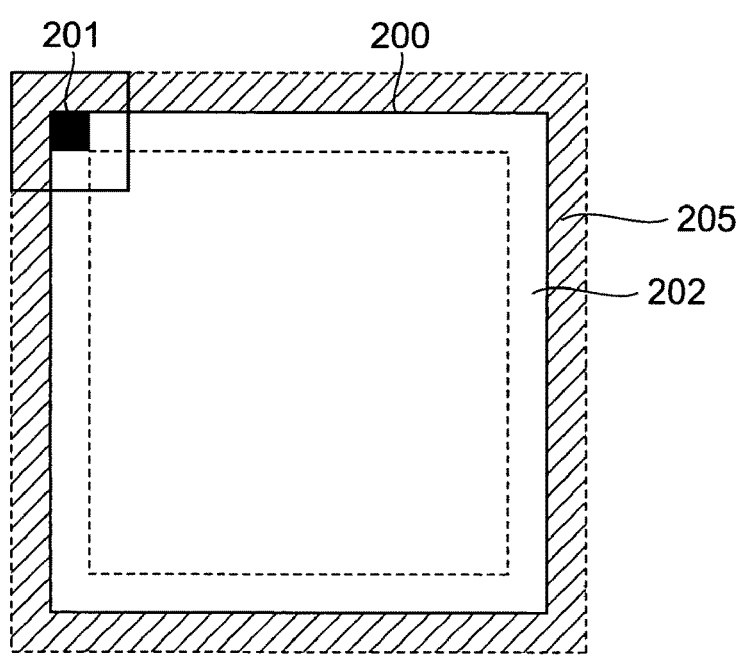

On the other hand, as shown in (b) of FIG. 13, outside the outermost peripheral region 202 of the imaging region 200, a virtual region (hatched) 205 consisting of a plurality of virtual pixels surrounding the imaging region 200 is set, and virtual data signals are provided for the respective virtual pixels inside this virtual region 205. By using these virtual data signals, to the data signals of the pixels positioned on the outermost periphery of the imaging region 200, mask processing can be preferably executed in the same manner as for other pixels.

Figure 14:
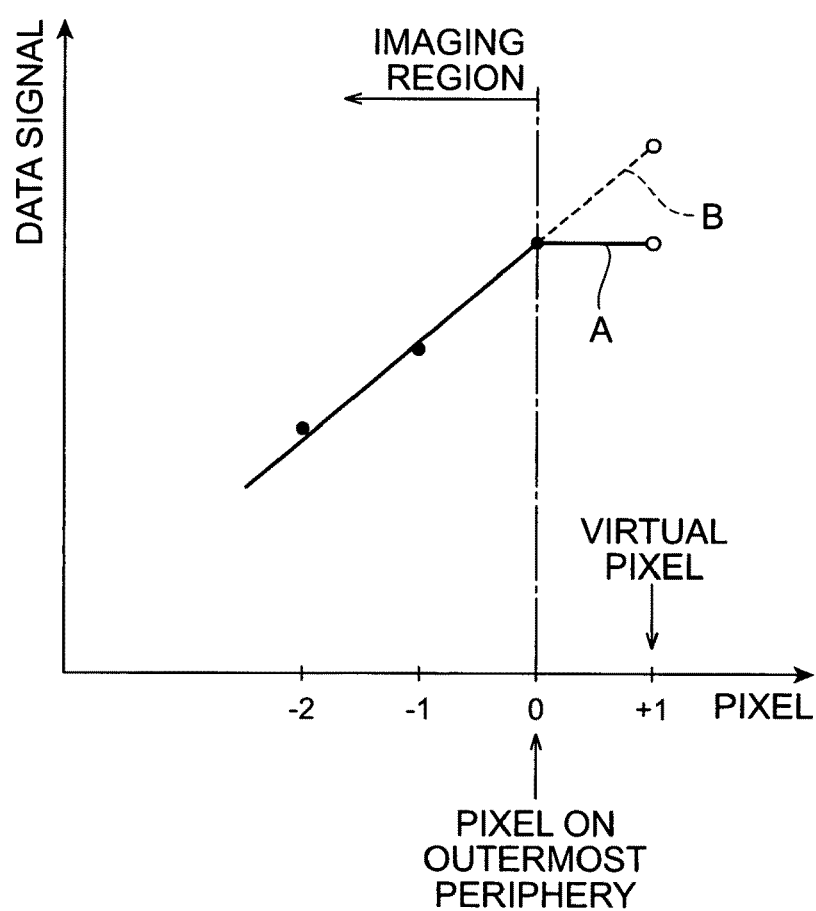
FIG. 14 is a diagram showing mask processing to the data signal of the outermost peripheral pixel.

As an example of a method for providing data signals for virtual pixels inside the virtual region 205, as schematically shown by the graph A with the solid line in FIG. 14, a method in which a value copied from a data signal of a pixel 0 on the outermost periphery is used as a virtual data signal of a virtual pixel +1 of the outside can be used. Alternatively, as schematically shown by the graph B with a dashed line in FIG. 14, in addition to the data signal of the pixel 0 on the outermost periphery, data signals of the pixels −1 and −2 on the inner side are referred to, and a value extrapolated from these data signals is used as a virtual data signal of the virtual pixel +1.

The range of the virtual region 205 for which such virtual data signals are provided must be set according to the detailed mask processing method. For example, in the example shown in (b) of FIG. 13, according to the assumption of dilation processing of 3×3 as mask processing, a region corresponding to one pixel (one circle) is set as the virtual region 205 and provided with virtual data signals outside the imaging region 200. On the other hand, when dilation processing of 5×5 is assumed as mask processing, a region corresponding to two pixels (two circles) outside the imaging region 200 must be set as the virtual region 205 and provided with virtual data signals.

Next, the method for controlling storing of data signals in the image data storage 32 by the data storing controller 37 will be further described.

In the imaging apparatus 1A of the above-described embodiment, as shown in FIG. 6, in the above-described configuration in which dilation processing is performed in the DSP 30 provided for output signals from the image pickup device 10, in the image data storage 32 in which data signals are stored in the DSP 30, data signals are stored in units of data signal sequences corresponding to pixel lines in the image pickup device 10, and n calculation memory regions A1 to An are set corresponding to the dilation coefficient n of mask processing. Thereby, in the digital signal processing means such as the DSP 30, it becomes possible to preferably realize mask processing for image data.

In detail, if the capacity of the internal memory of the DSP 30 is sufficient, and all data signals of image data acquired in the image pickup device 10, that is, data signals of one frame image in the entire imaging region 300 (see FIG. 15) consisting of a plurality of two-dimensionally arrayed pixels can be stored in the internal memory, at the time of execution of mask processing, necessary data signals can be readout from the image data and mask processing is performed.

Figure 15:
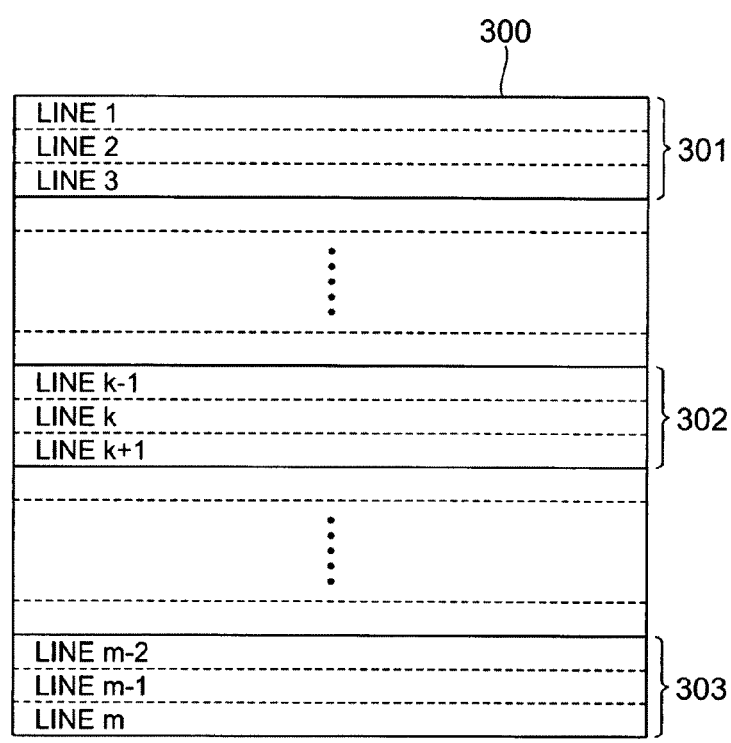
FIG. 15 is a diagram showing image data of an imaging region consisting of a plurality of two-dimensionally arrayed pixels.

For example, in the imaging region 300 shown in FIG. 15, when the dilation coefficient is set to n=3, as indicated by three pixel block examples of a pixel block 301 of the pixel lines 1 to 3, a pixel block 302 of the pixel lines k−1 to k+1, and a pixel block 303 of the pixel lines m−2 to m, three data signal sequences corresponding to a pixel block consisting of three pixel lines continuous in the vertical direction, are successively readout, whereby mask processing of 3×3 can be executed. On the other hand, in the DSP 30, due to its configuration, the capacity of the internal memory is normally limited, and it is difficult to store all of the data signals of one frame image in the internal memory.

On the other hand, as described above, by securing n calculation memory regions A1 to An corresponding to the dilation coefficient n, it becomes possible that n data signal sequences necessary for dilation processing of n×n are stored in the calculation memory regions A1 to An in the image data storage 32 of the DSP 30 and mask processing to be executed for image data in the DSP 30 can be preferably and reliably realized.

In this configuration, it is preferable that the data storing controller 37 sets the n calculation memory regions A1 to An in the image data storage 32 as a ring buffer, and corresponding to the mask processing execution status in the mask processor 34, successively stores a plurality of data signal sequences corresponding to a plurality of pixel lines in the image pickup device 10 in the calculation memory regions A1 to An as a ring buffer. By thus constructing a ring buffer by the memory regions A1 to An in the image data storage 32, it becomes possible that the internal memory of the DSP 30 is efficiently used and the storing and input/output of data signals and mask processing to the data signals in the image data storage 32 is efficiently executed at a high speed.

Figure 16:
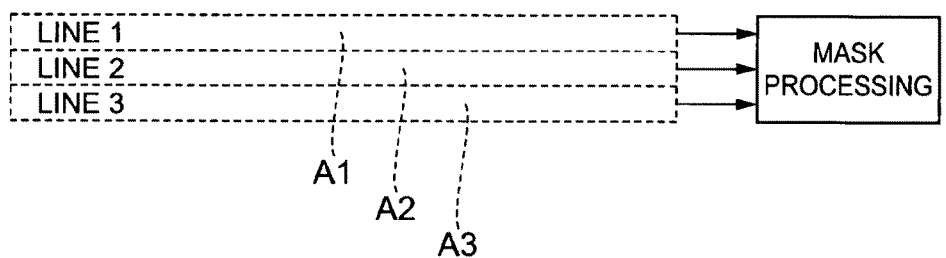
FIG. 16 is a figure of diagrams showing an example of a method for controlling storing of data signals in the image data storage.
Figure 16:
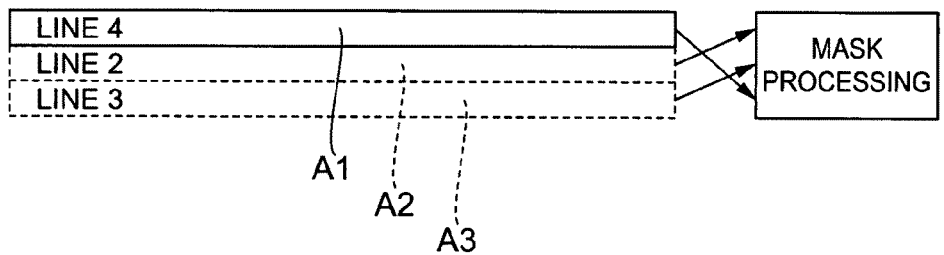
Figure 16:
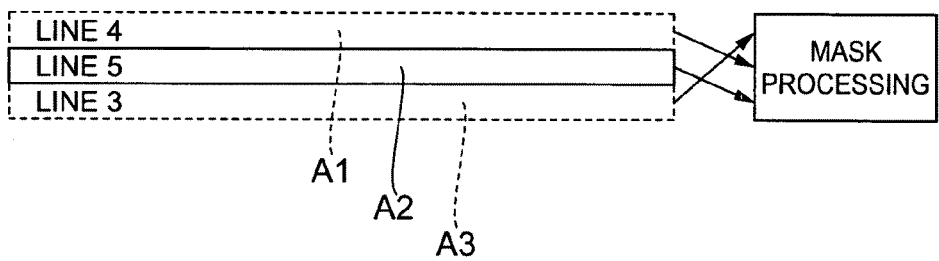

FIG. 16 is a figure of diagrams showing an example of a method for controlling storing of data signals in the image data storage 32 when the dilation coefficient is set to n=3. In this case, as the calculation memory regions, three calculation memory regions A1 to A3 are set.

First, in (a) of FIG. 16, data signal sequences of pixel lines 1, 2, and 3 are stored in the calculation memory regions A1 to A3. Then, these data signal sequences are given to a subroutine of mask processing in the order of the data signal sequence of line 1 stored in the region A1, the data signal sequence of line 2 stored in the region A2, and the data signal sequence of line 3 stored in the region A3, and mask processing is performed for the data signals in the data signal sequence of the central pixel line 2.

Next, in (b) of FIG. 16, on the calculation memory region A1 in which the data signal sequence of pixel line 1 had been stored, the data signal sequence of the next pixel line 4 is written, and data signal sequences of pixel lines 4, 2, and 3 are stored in the calculation memory regions A1 to A3. Then, these data signal sequences are given to the subroutine of mask processing in the order of the data signal sequence of line 2 stored in the region A2, the data signal sequence of line 3 stored in the region A3, and the data signal sequence of line 4 stored in the region A1, and mask processing is performed for the data signals in the data signal sequence of the central pixel line 3.

Subsequently, in (c) of FIG. 16, on the calculation memory region A2 in which the data signal sequence of pixel line 2 had been stored, the data signal sequence of the next pixel line 5 is written, and data signal sequences of pixel lines 4, 5, and 3 are stored in the calculation memory regions A1 to A3. Then, these data signal sequences are given to the subroutine of mask processing in the order of the data signal sequence of line 3 stored in the region A3, the data signal sequence of line 4 stored in the region A1, and the data signal sequence of line 5 stored in the region A2, and mask processing is performed for the data signals in the data signal sequence of the central pixel line 4.

As the configuration of the memory regions in the image data storage 32, it is preferable that, as shown in FIG. 6, the data storing controller 37 sets an input buffer memory region A0 in which a data signal sequence to be inputted next to the n data signal sequences stored in the calculation memory regions A1 to An is stored in the image data storage 32, in addition to the n calculation memory regions A1 to An. In this case, with respect to n data signal sequences to be used for mask processing, a data signal sequence that becomes necessary for the next mask processing can be inputted and stored in the input buffer memory region A0. Thereby, the efficiency and processing rate of mask processing to be executed for data signals of the respective data signal sequences, successively, can be further improved.

In this configuration, it is preferable that the data storing controller 37 sets n+1 memory regions A0 to An including the n calculation memory regions A1 to An and the input buffer memory region A0 in the image data storage 32 as a ring buffer, and successively stores a plurality of data signal sequences corresponding to a plurality of pixel lines in the image pickup device 10 in the n+1 memory regions A0 to An as a ring buffer according to the mask processing execution status in the mask processor 34. Thus, by constructing a ring buffer by the n+1 memory regions without fixing the input buffer memory region, data copying from the input buffer memory region into the calculation memory regions becomes unnecessary, and the speeds of operations such as storing and input/output of data signals in the image data storage 32 can be further improved.

FIG. 17 is a figure of diagrams showing an example of a method for controlling storing of data signals in the image data storage 32 when n+1 memory regions A0 to An of the calculation memory regions A1 to An and the input buffer memory region A0 are set. This control method adapts to the memory configuration shown in FIG. 6.

First, in (a) of FIG. 17, data signal sequences of pixel lines 1 to n are stored in the memory regions A1 to An. The memory region A0 serves as an input buffer memory region, and during execution of mask processing by using the data signal sequences of the pixel lines 1 to n, a data signal sequence of the next pixel line n+1 is inputted into this memory region A0.

Next, in (b) of FIG. 17, data signal sequences of pixel lines 2 to n+1 are stored in the memory regions A2 to An and A0. The memory region A1 serves as an input buffer memory region, and during execution of mask processing by using the data signal sequences of the pixel lines 2 to n+1, the data signal sequence of the next pixel line n+2 is inputted into this memory region A1.

By repeating this storing operation, in (c) of FIG. 17, data signal sequences of pixel lines n+1 to 2n are stored in the memory regions A0 to An−1. The memory region An serves as an input buffer memory region, and during execution of mask processing by using the data signal sequences of the pixel lines n+1 to 2n, the data signal sequence of the next pixel line 2n+1 is inputted into this memory region An.

Next, in (d) of FIG. 17, data signal sequences of pixel lines n+2 to 2n+1 are stored in the memory regions A1 to An. The memory region A0 serves as an input buffer memory region, and during execution of mask processing by using the data signal sequences of the pixel lines n+2 to 2n+1, the data signal sequence of the next pixel line 2n+2 is inputted into this memory region A0.

By thus constructing a ring buffer in the image data storage 32, it becomes possible to efficiently execute storing and input/output of data signals in the image data storage 32 and mask processing to the data signals. In such a ring buffer, by providing the input buffer memory region A0 in addition to the calculation memory regions A1 to An, for n data signal sequences to be used for mask processing, it becomes possible to input and store a data signal sequence that become necessary for the next mask processing in the input buffer memory region A0 concurrently with the mask processing. Thereby, the processing rate of the mask processing to be executed successively for the respective data signal sequences can be further improved.

The imaging apparatus of the present invention is not limited to the above-described embodiments and configuration examples, and can be varied in various ways. For example, the detailed method of dilation processing of n×n for the respective data signals of the image data is not limited to the examples shown in FIG. 4, FIG. 5, and FIG. 12, and various mask processing methods can be used according to the characteristics and types of image data to be masked. The solid-state image pickup device to be applied to the imaging apparatus is not limited to the above-described EM-CCD, and various solid-state image pickup devices may be used. The digital signal processor (DSP) includes processors configured so as to be capable of processing digital signals in the broad sense, and various configurations may be used in detail.

Herein, the imaging apparatus of the above-described embodiment includes: (1) a solid-state image pickup device which has a pixel structure formed by a plurality of two-dimensionally arrayed pixels constructed by aligning vertically a plurality of pixel lines each consisting of a predetermined number of pixels aligned horizontally and outputs charge signals generated in the respective pixels; (2) A/D converting means for converting analog signals of charge signals from the respective pixels of the solid-state image pickup device into digital data signals; and (3) digital signal processing means for performing signal processing for data signals outputted from the A/D converting means, wherein the digital signal processing means includes: (4) image data storing means for storing data signals inputted from the A/D converting means into the digital signal processing means in units of data signal sequences each consisting of a predetermined number of data signals corresponding to the pixel lines in the solid-state image pickup device; (5) mask processing means for executing, for image data composed of a plurality of data signals corresponding to the plurality of pixels in the solid-state image pickup device, mask processing for dilating an image component in the image data to n×n by setting an integer n not less than 2 as a dilation coefficient; and (6) data storing control means for controlling storing and input/output of the data signals in the image data storing means, and according to the dilation coefficient n set by the mask processing means, setting n calculation memory regions in which n data signal sequences corresponding to the n pixel lines continuous in the vertical direction in the solid-state image pickup device are stored, respectively, in the image data storing means.

As the solid-state image pickup device to be used in the imaging apparatus having the above-described configuration, as described above, an electron multiplying solid-state image pickup device which outputs charge signals generated in the plurality of pixels, respectively, and has an electron multiplier section which multiplies the charge signals can be preferably used. Similarly, to other image pickup devices, the above-described configuration can be applied.

As a detailed configuration for storing n data signal sequences in the image data storing means, it is preferable that the data storing control means sets n calculation memory regions in the image data storing means as a ring buffer, and successively stores the plurality of data signal sequences corresponding to the plurality of pixel lines in the solid-state image pickup device in the n calculation memory regions as the ring buffer, according to a mask processing execution status in the mask processing means. By thus constructing a ring buffer in the image data storing means, it becomes possible that the internal memory of the digital signal processing means is efficiently used and storing and input/output of data signals in the image data storing means and mask processing for the data signals are efficiently executed at a high speed.

It is preferable that the data storing control means sets an input buffer memory region in which a data signal sequence to be inputted next to the n data signal sequences stored in the n calculation memory regions is stored, in the image data storing means in addition to the n calculation memory regions. In this case, it becomes possible that, with respect to n data signal sequences to be used for mask processing, a data signal sequence that becomes necessary for the next mask processing is inputted and stored in the input buffer memory region. Thereby, the efficiency and processing rate of mask processing to be successively executed for data signals of the respective data signal sequences can be further improved.

In this case, as a configuration of the ring buffer, it is preferable that the data storing control means sets n+1 memory regions including the n calculation memory regions and the input buffer memory region in the image data storing means as a ring buffer, and successively stores the plurality of data signal sequences corresponding to the plurality of pixel lines in the solid-state image pickup device in the n+1 memory regions as the ring buffer according to a mask processing execution status in the mask processing means.

For the data signals after mask processing in the digital signal processing means, it is preferable that the data storing control means sets an output buffer memory region in which data signals after mask processing by the mask processing means are stored in the image data storing means.

Concerning mask processing to be performed by using the n data signal sequences stored in the n calculation memory regions as described above, in detail, it is preferable that the mask processing means performs mask processing by setting a data signal in a central data signal sequence of the n data signal sequences stored in the n calculation memory regions as a processing target and by referring to n×n data signals in the range of n×n centered on the data signal. Thereby, mask processing can be preferably executed for the plurality of data signal sequences, respectively.

It is preferable that, when a data signal as a processing target is a data signal corresponding to a pixel positioned on the outermost periphery of the pixel structure consisting of the plurality of pixels, the mask processing means performs mask processing for the data signal by providing virtual data signals for a region including no pixel outside the structure. Thereby, mask processing can also be preferably executed for the data signal of the pixel on the outermost periphery of the image data.

For image processing to be executed in the digital signal processing means, preferably, the digital signal processing means has noise removing means which sets a predetermined intensity value as an intensity threshold for noise removal for the plurality of data signals corresponding to the plurality of pixels in the solid-state image pickup device and removes the data signal having an intensity value not more than the intensity threshold as noise, and the mask processing means sets the data signals except for the data signal removed by the noise removing means as the image components of processing targets, and performs mask processing to dilate the image components to n×n.

It is preferable that the digital signal processing means has binarization processing means which sets a predetermined intensity value as an intensity threshold for binarization for the plurality of data signals corresponding to the plurality of pixels in the solid-state image pickup device, and binarizes the data signals by using the intensity threshold, and the mask processing means sets the data signals binarized by the binarization processing means as the image components of processing targets and performs mask processing to dilate the image components to n×n.

It is preferable that, concerning mask processing to be executed for image data, the digital signal processing means has mode control means which performs switching between a mask processing mode in which mask processing is executed by the mask processing means and a normal processing mode in which the mask processing is not executed. Thereby, it becomes possible to perform image acquisition according to the imaging condition such as switching as to whether the mask processing is to be executed according to the imaging condition when acquiring an image in actuality.

The data storing control means may control the output of the data signals in the image data storing means so that both of the data signals before mask processing and data signals after mask processing by the mask processing means are outputted. In this case, an operator who operates the imaging apparatus can acquire both image data before and after mask processing as appropriate.

The present invention is usable as an imaging apparatus capable of acquiring an image with excellent visibility even under conditions of a low illuminance and a small number of incident photons.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An imaging apparatus comprising:
   a solid-state image pickup device which has a pixel structure formed by a plurality of two-dimensionally arrayed pixels constructed by aligning vertically a plurality of pixel lines each consisting of a predetermined number of pixels aligned horizontally and outputs charge signals generated in the respective pixels;

A/D converting means for converting analog signals of the charge signals from the respective pixels of the solid-state image pickup device into digital data signals; and digital signal processing means for performing signal processing for the data signals outputted from the A/D converting means, wherein the digital signal processing means comprises:

image data storing means for storing the data signals inputted from the A/D converting means into the digital signal processing means in units of data signal sequences each consisting of a predetermined number of data signals corresponding to the pixel lines in the solid-state image pickup device;

mask processing means for executing, for image data composed of a plurality of data signals corresponding to the plurality of pixels in the solid-state image pickup device, mask processing for dilating an image component in the image data to n×n by setting an integer n not less than 2 as a dilation coefficient; and data storing control means for controlling storing and input/output of the data signals in the image data storing means, and according to the dilation coefficient n set by the mask processing means, setting n calculation memory regions in which n data signal sequences corresponding to the n pixel lines continuous in the vertical direction in the solid-state image pickup device are stored, respectively, in the image data storing means.

2. The imaging apparatus according to claim 1, wherein the data storing control means sets the n calculation memory regions in the image data storing means as a ring buffer, and successively stores the plurality of data signal sequences corresponding to the plurality of pixel lines in the solid-state image pickup device in the n calculation memory regions as the ring buffer, according to a mask processing execution status in the mask processing means.

3. The imaging apparatus according to claim 1, wherein the data storing control means sets an input buffer memory region in which a data signal sequence to be inputted next to the n data signal sequences stored in the n calculation memory regions is stored, in the image data storing means in addition to the n calculation memory regions.

4. The imaging apparatus according to claim 3, wherein the data storing control means sets n+1 memory regions including the n calculation memory regions and the input buffer memory region in the image data storing means as a ring buffer, and successively stores the plurality of data signal sequences corresponding to the plurality of pixel lines in the solid-state image pickup device in the n+1 memory regions as the ring buffer, according to a mask processing execution status in the mask processing means.

5. The imaging apparatus according to claim 1, wherein the data storing control means sets an output buffer memory region in which data signals after mask processing by the mask processing means are stored in the image data storing means.

6. The imaging apparatus according to claim 1, wherein the mask processing means performs mask processing by setting a data signal in a central data signal sequence of the n data signal sequences stored in the n calculation memory regions as a processing target and by referring to n×n data signals in the range of n×n centered on the data signal.

7. The imaging apparatus according to claim 1, wherein, when a data signal as a processing target is a data signal corresponding to a pixel positioned on the outermost periphery of the pixel structure consisting of the plurality of pixels, the mask processing means performs mask processing for the data signal by providing virtual data signals for a region including no pixel outside the structure.

8. The imaging apparatus according to claim 1, wherein the digital signal processing means comprises:

noise removing means which sets a predetermined intensity value as an intensity threshold for noise removal for the plurality of data signals corresponding to the plurality of pixels in the solid-state image pickup device and removes the data signal having an intensity value not more than the intensity threshold as noise, and the mask processing means sets the data signals except for the data signal removed by the noise removing means as the image components of processing targets, and performs mask processing to dilate the image components to n×n.

9. The imaging apparatus according to claim 1, wherein the digital signal processing means comprises:

binarization processing means which sets a predetermined intensity value as an intensity threshold for binarization for the plurality of data signals corresponding to the plurality of pixels in the solid-state image pickup device, and binarizes the data signals by using the intensity threshold, and the mask processing means sets the data signals binarized by the binarization processing means as the image components of processing targets and performs mask processing to dilate the image components to n×n.

10. The imaging apparatus according to claim 1, wherein the digital signal processing means comprises:

mode control means which performs switching between a mask processing mode in which mask processing is executed by the mask processing means for the image data and a normal processing mode in which the mask processing is not executed.

11. The imaging apparatus according to claim 1, wherein the data storing control means controls the output of the data signals in the image data storing means so that both of the data signals before mask processing and data signals after mask processing by the mask processing means are outputted.

12. The imaging apparatus according to claim 1, wherein the solid-state image pickup device is an electron multiplying solid-state image pickup device which outputs the charge signals generated in each of the plurality of pixels, and has an electron multiplier section which multiplies the charge signals.

* * * * *